United States Patent [19]

Kato

[11] 3,815,034

[45] June 4, 1974

[54] DEMODULATOR FOR PHASE-MODULATED CARRIER WAVES

[75] Inventor: Kotaro Kato, Tokyo, Japan

[73] Assignee: Nippon Electric Company, Limited, Tokyo, Japan

[22] Filed: Sept. 28, 1972

[21] Appl. No.: 293,188

[30] Foreign Application Priority Data

Oct. 6, 1971 Japan ................................ 46-78903

[52] U.S. Cl. .................... 329/104, 178/88, 325/320, 329/112

[51] Int. Cl. ............................................ H04l 27/22

[58] Field of Search .................... 329/104, 110, 112; 178/66 R, 88; 325/320

[56] References Cited

UNITED STATES PATENTS

| | | | |
|---|---|---|---|
| 3,294,907 | 12/1966 | Heald | 325/320 X |
| 3,417,333 | 12/1968 | Atzenbeck | 325/320 |
| 3,588,349 | 6/1971 | Kawai | 325/320 X |
| 3,594,651 | 7/1971 | Wolejsza | 325/320 X |
| 3,675,139 | 7/1972 | Guest | 329/112 X |
| 3,697,881 | 10/1972 | Nakagome et al. | 325/320 X |

*Primary Examiner*—Alfred L. Brody
*Attorney, Agent, or Firm*—Sughrue, Rothwell, Mion, Zinn & Macpeak

[57] ABSTRACT

A demodulator for a multi-phase phase-modulated signal carrier wave having $2^m$-phase phase-modulated bursts, m being a positive integer, and where each burst has at its leading end portion a $2^n$-phase phase-modulated synchronizing signal, n being a positive integer smaller than m. The synchronizing signal of each burst is temporarily phase-demodulated by a $2^n$-phase phase demodulator until the phase difference between the signal carrier wave and a reference carrier wave derived from the signal carrier wave is eliminated to permit demodulation of the remainder of the $2^m$-phase phase-modulated burst.

4 Claims, 4 Drawing Figures

PATENTED JUN 4 1974

3,815,034

DEMODULATOR FOR PHASE-MODULATED CARRIER WAVES

BACKGROUND OF THE INVENTION

1. Field of the Invention

This invention relates to a device for demodulating phase-modulated carrier waves and, more particularly, to a device of this kind suited for the multi-phase modem for a satellite communication system.

2. Description of the Prior Art

Recently, there has been an increasing demand for satellite communications. Since the principal part of the cost of constructing a satellite communication system is occupied by the manufactured cost of the artificial satellite itself, efficient use should be made of the on-board relay equipment.

The time division multiple access (TDMA) system has been proposed for this purpose, in which the repeater is efficiently shared by a number of earth stations in a time division fashion. In such a system, the phase modem adapted to the encoded information signals is known to be effective. For the handling of a greater amount of information, a multi-phase phase modem system is preferred. In the TDMA communication system now in use, the signals from each of the earth stations are divided for transmission into groups of signals of suitable duration forming "bursts." The bursts transmitted from each earth station are time-division multiplexed at the on-board relay equipment. On the other hand, carrier wave frequencies assigned to individual earth stations are slightly different from one another and are not mutually synchronized.

For the signal reception at an earth station, the so-called synchronized detection system is known to be effective, which relies on a reference carrier wave synchronized with a carrier wave component extracted from the received signal. However, the received carrier wave does not remain synchronized during the period lying between every two burst signals. It is therefore necessary to generate the reference carrier wave which is in synchronism with the received carrier wave at every time point corresponding to a burst.

However, a certain amount of time is needed for the completion of this process of the carrier synchronization or the carrier wave restoration. This results in a large phase difference between the received carrier wave and the generated reference carrier wave, and consequently in a marked increase in the code error rate particularly at the time point corresponding to the leading portion of each burst where the above-mentioned synchronization process is not completed yet. In practice, therefore, most of the time-division multiple-access satellite communication systems resort to a synchronizing signal for the reference carrier wave restoration, this signal being inserted at the leading portion of every burst transmitted from each ground station as will be described below. The synchronizing signal for the multi-phase phase modulation, e.g., four-phase phase modulation, is in the same form as that for a phase modulation of a smaller number of multi-phases, e.g., two-phase phase modulation. However, with a conventional $2^m$-phase ($m$ is a positive integer) phase demodulator for receiving the burst signals, the phase demodulator should always be capable of discriminating $2^m$ discrete phases of the carrier wave. This tends to cause the above-mentioned phase difference at the time point corresponding to the leading portion of each burst, to cause noise, etc., thereby eventually increasing the code error rate.

SUMMARY OF THE INVENTION

The object of this invention is therefore to provide a demodulator for phase-modulated carrier waves, capable of reducing the code error which tends to be caused at the time point corresponding to the leading portion of every burst, to thereby mitigate the adverse effect of the code error on the reference carrier generation.

In the present invention, a $2^n$-phase phase modulated synchronizing signal (where $n$ is a positive integer smaller than $m$) inserted at the leading portion of every burst for the $2^m$-phase phase modulation is temporarily phase demodulated by $2^n$-phase phase demodulator until the end of the interval corresponding to the leading portion of each burst component, or until the time point where the phase difference between the generated reference carrier wave and the received carrier wave is virtually eliminated.

For example, when the synchronizing signal is inserted at the leading portion of every burst for a four-phase phase-modulation so as to keep all the bits falling in the leading portion in the same phase to constitute a virtual two-phase phase modulation, the four-phase phase demodulator temporarily functions as a two-phase phase demodulator throughout the above-mentioned interval. Thus, the present invention combines the advantages of the two-phase phase demodulation and the four-phase phase demodulation, so as to avert the adverse effect of the above-mentioned phase difference.

Although the principle of the present invention is applicable to the $2^m$-phase phase demodulation by the use of a $2^n$-phase phase demodulator (where $n$ is a positive integer smaller than $m$), the following description will be given, for simplicity, about the demodulation of a four-phase phase-modulated wave by a two-phase phase demodulator.

As is well known, the two-phase phase modem system is more advantageous than the four-phase phase modem system in terms of the code error rate for a given carrier power vs. noise power ratio (C/N ratio). It is also well known that the phase relationship between the received carrier wave and the reference carrier wave generated at the $2^m$-phase phase demodulator has $2^m$ stabilized points spaced from one another by a phase difference of about $360°/2^m$. Also, the probability of the skipping from one stabilized point to another increases as the phase difference occurring in the acquisition process increases, causing an adverse effect on the acquisition process itself. In this respect also, the above-mentioned temporary two-phase phase demodulation scheme of the present invention makes a great contribution to the marked decrease in the skipping from one stabilized state to another.

BRIEF DESCRIPTION OF THE DRAWINGS

An embodiment of this invention will now be described referring to the accompanying drawings, in which.

DESCRIPTION OF THE PREFERRED EMBODIMENTS

Figures 1, 2, 3, 4:
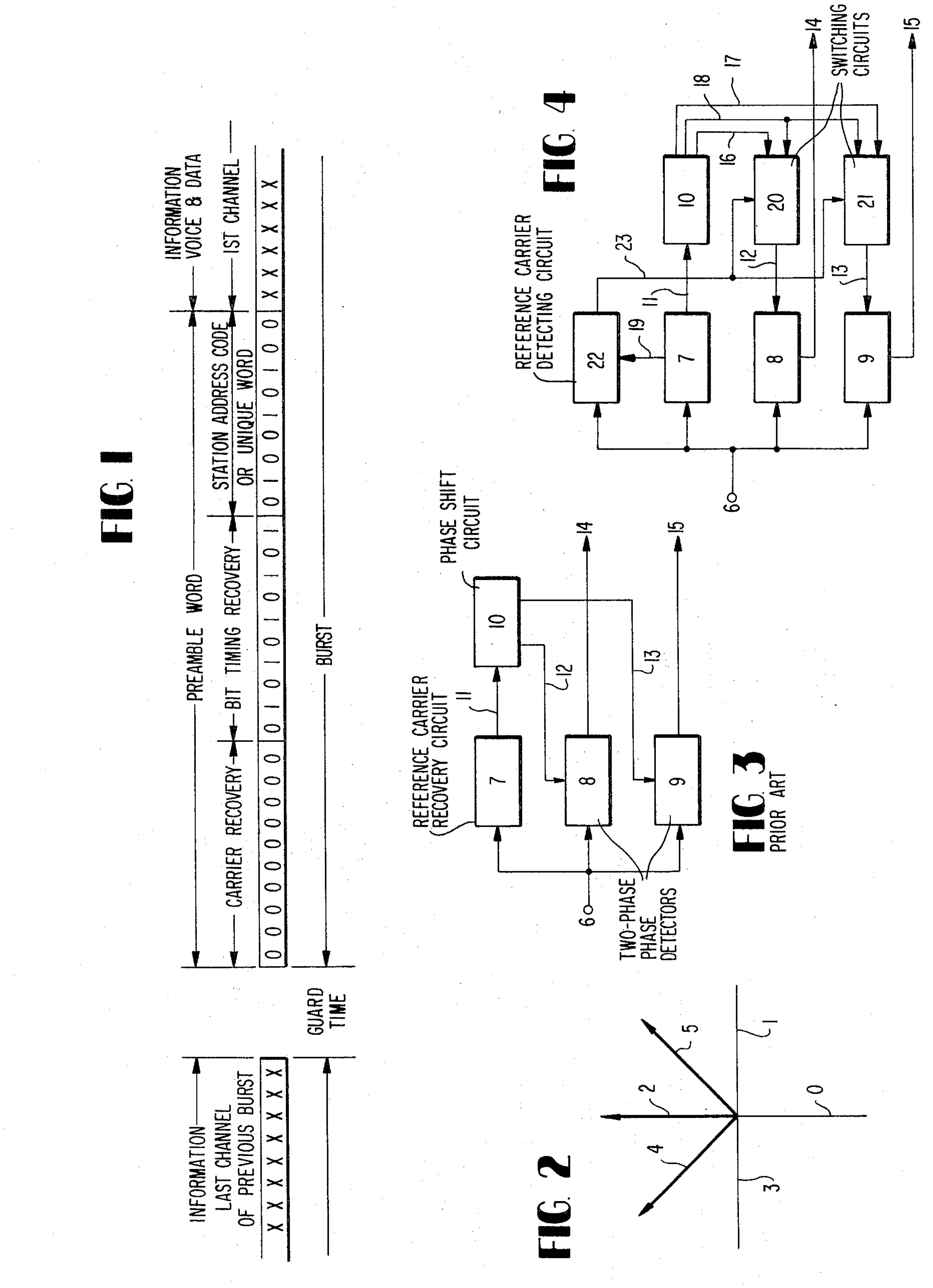
FIG. 1 is a timing diagram of a burst signal.
FIG. 2 is a diagram illustrating the phase relationship between the four-phase phase-modulated wave and the reference carrier wave regenerated at the phase demodulator.
FIG. 3 is a block diagram of an example of a conventional four-phase phase demodulator.
FIG. 4 is a block diagram of a phase demodulator embodying the present invention.

As is shown in FIG. 1, a burst consists of a preamble word and information (voice and/or data) channels. The preamble word includes a "carrier recovery" portion in which all the bits are identical in phase to each other and which is for establishing a synchronized relationship between the received carrier wave and the reference carrier wave generated at the receiver. The carrier recovery portion is followed first by a "bit timing recovery" portion where each digit is two-phase phase modulated, and then by a "station address code or unique word" where each digit is also two-phase phase modulated, and then comes the information channels where each digit is four-phase phase modulated.

Referring to FIG. 2, the reference numerals 0, 1, 2, and 3 indicate four-phase positions of the received phase-modulated carrier waves. The phase difference between neighbouring phase positions is approximately 90 degrees. The reference carrier waves used in the phase demodulator usually take the phase positions 4 and 5. The phase position 4 has a phase difference of approximately 45 degrees with respect to both the phase positions 2 and 3, while another phase position 5 has a phase difference of approximately 45 degrees with respect to the positions 1 and 2.

Referring to FIG. 3 which shows a conventional four-phase phase demodulator as a whole and continuing to refer to FIG. 2, an incoming signal is applied to an input terminal 6 and a reference carrier recovery circuit 7 is adapted to generate the reference carrier wave whose phase is forcibly corrected at every burst. The reference carrier wave is fed to a phase-shift circuit 10 through a wiring 11 to generate two phase-shifted reference carrier waves having phase positions 4 and 5, respectively (FIG. 2). These reference carrier waves are supplied to two two-phase phase detectors 8 and 9 respectively through wiring 12 and 13. At phase detector 8, the phase difference between one recovered (phase shifted) reference carrier wave and the input signal incoming from input terminal 6 is detected, whereas at other phase detector 9, the phase difference is detected between the other phase-shifted reference carrier wave and the incoming received signal. In this way, the two phase-detected outputs are obtained as a four-phase phase demodulated output at the output terminals 14 and 15 connected to the phase comparators 8 and 9, respectively.

These two outputs at output terminals 14 and 15 of the two phase detectors 8 and 9 are as shown in the following Table 1, with respect to the phase positions 0, 1, 2, and 3 (FIG. 1).

| Phase Position | Output digit at terminal 14 | Output digit at terminal 15 |
|---|---|---|
| 0 | 0 | 0 |
| 1 | 0 | 1 |
| 2 | 1 | 1 |
| 3 | 1 | 0 |

Assuming that the input wave has phase position 0 or 2, the output at terminals 14 and 15 become either (0 0) or (1 1). Further, even when the two-phase phase demodulation wherein the phase position 0 or 2 is used as the reference phase position in place of the positions 4 and 5 is maintained, the outputs at terminals 14 and 15 are (0 0) or (1 1), which is identical to the output obtained from the four-phase phase demodulation. In other words, when the received carrier wave is allowed to take the phase position 0 or 2 only, the demodulation output obtainable through the two-phase phase demodulator is identical to that from the four-phase phase demodulator.

In FIG. 4 illustrating the block diagram of an embodiment of this invention, like reference numerals are used to designate like constituents employed in the conventional system of FIG. 3. The received carrier wave incoming from input terminal 6 is led to reference carrier wave recovery circuit 7, phase detectors 8 and 9, and a reference carrier wave detecting circuit 22, which is for detecting the reference carrier wave recovered at the circuit 7. Reference carrier wave recovery circuit 7 is set to begin the recovery of the reference carrier every time the burst component is received. The reference carrier wave is applied to a phase-shift circuit 10 through a wiring 11 to produce three reference carrier waves of 45 degree phase difference as shown by reference numerals 4, 5, and 2 in FIG. 1 on wiring 16, 17, and 18, respectively. On the other hand, the output of reference carrier recovery circuit 7 is fed via line 19 to the reference carrier detecting circuit 22 including a phase comparator for phase comparison therein with the received modulated wave. The phase comparator may comprise a multiplier and a plurality of filters not shown. The monitoring of the phase difference between the two is achieved in such a manner that the completion of the carrier wave recovery is designated by a phase difference smaller than a predetermined value. In other words, at this time point, an output multiplied with the received wave and the reference carrier in the multiplier is allowed to pass through a low pass filter not shown which has a predetermined low frequency pass band. The signal passing through the low pass filter appears at the output terminal of circuit 22 as a signal indicating completion of carrier wave recovery. On the other hand, a phase difference larger than the predetermined value indicates that the carrier wave recovery is not completed. The multiplied output occurs as a signal indicating the incomplete recovery at the wiring 23 through a high pass filter having comparatively higher pass band installed in circuit 22.

A reference carrier wave of phase position 2 (FIG. 2) appearing at wiring 18 is applied to a first and a second switching circuit 20 and 21, while another reference carrier wave of phase position 4 appearing at wiring 16 is applied to the first switching circuit 20, and still another carrier wave of phase position 5 appearing at wiring 17 is applied to the second switching circuit 21. Switching circuit 20 is for selecting one of the reference carrier waves of phase positions 2 and 4, depending on the output of reference carrier detecting circuit 22. The output appears at a wiring 12 connected to the phase detector 8. The signal appearing at the wiring 12 is identical to the reference carrier wave of phase position 4 appearing at wiring 16 when the reference carrier recovery has been completed, and identical to the reference carrier wave of phase position 2 on wiring 18 when the recovery has not been completed. In like manner, switching circuit 21 selects one of the received signals of phase positions 5 and 2 appearing at wiring 17 and 18, to deliver an output signal to wiring 13. The signal appearing at the wiring 13 is identical to the signal of the phase position 5 appearing at wiring 17 when the reference carrier wave recovery has been completed, while it is identical to the signal of the phase position 2 appearing at wiring 18 if otherwise. The outputs from switching circuits 20 and 21 are applied respectively to phase detectors 8 and 9. So long as the reference carrier wave recovery is not completed, the two-phase phase detectors 8 and 9 function respectively as two-phase phase demodulators with the regenerated reference carrier wave supplied thereto respectively, thereby detecting whether the received signal is in phase or in opposite phase (180° phase difference) with respect to the reference carrier wave while the reference carrier wave recovery is not completed. Upon completion of the reference carrier wave recovery, the reference carrier detecting circuit 22 delivers an output at the wiring 23 to actuate the switching circuits 20 and 21, which respectively make the signals appearing at wiring 12 and 13 identical to those at wiring 16 and 17. As a result, the combination of the two phase detectors 8 and 9 returns to the mode of four-phase phase demodulators. Switching circuits 20 and 21 may be readily implemented by those skilled in the art using simple logic gates.

As will be apparent from the foregoing description, the phase demodulator employed in the present system is capable of functioning as two-phase phase demodulators during the transient period in which the carrier wave recovery is not completed and which corresponds to that leading portion of every one of the successively incoming bursts where the synchronizing signal is inserted, and functioning also as four-phase phase demodulators as soon as the carrier wave recovery is achieved or the information signal starts coming into the demodulators.

In this embodiment, the carrier wave recovery must be completed while the incoming received signal is a virtual two-phase signal. In other words, the reference carrier wave detecting circuit 22 has only to detect those portions of the incoming received signal which are virtually two-phase phase-modulated. Therefore, any two-phase signal detecting circuit may be employed in place of the aforesaid reference carrier wave detecting circuit 22. Furthermore, since the two-phase signal period, which corresponds to the leading portion of every one of the bursts being transmitted from each earth station and in which the carrier wave recovery must be completed, is usually predetermined, the reference carrier wave detecting circuit 22 may be replaced by a combination of a means for detecting the leading edge of the burst, e.g., an envelope detector, and means for predicting a two-phase input signal, e.g., a time-interval defining circuit exemplified by a monostable multivibrator. Specific circuits suitable for use as the detecting circuit 22 are described in a number of textbooks. In particular, Chapter 13 of the text entitled *Data Transmission*, by William R. Bennett and James R. Davey, published by McGraw-Hill Book Co. (1965), describes such circuits. Chapter 13 is titled "Method of Establishing a Reference Carrier for Synchronous Detection" and illustrates at FIGS. 13–1 and 13–2 circuits usable as the detecting circuit 22.

For the bit synchronization essential to a code communication system, it is the common practice to extract on the receiving side the bit synchronizing signal component from the received signal. Even in the time-division multiple access satellite communications system, a failure in the reproduction of the bit synchronizing signal appreciably affects the code error rate. To avoid such failure and to facilitate the bit synchronizing signal reproduction at the receiving side, it has been the practice to add, at that part of the leading portion of every one of the bursts which immediately follows the above-mentioned part assigned to the synchronizing signal for the reference carrier wave recovery, a bit synchronization recovery signal (or bit timing signal), which makes every two adjacent bits 180 degrees out of phase (FIG. 1). Since the bit synchronization recovery signal portion can be regarded as a two-phase signal, the circuit 22 in the embodiment can be made to function also as a circuit for detecting the completion of the recovery of the bit synchronization signal.

Furthermore, the circuit 22 in the embodiment can be replaced by a circuit for predicting or detecting the portions which show the same phase variation as the two-phase phase-modulated signal (see the description of FIG. 1).

Although a description has been given above of the embodiment for the case of the four-phase phase-modulated burst signal where the leading portion of every burst is two-phase phase-demodulated, it will be apparent that the same technique is applicable to a generalized case where the leading portion of the $2^m$-phase phase-modulated burst signal is $2^n$-phase phase-demodulated ($n$ is an integer smaller than $m$) by suitably selecting the number of phase detectors and switching circuits as well as the phase positions of the carrier wave for the $2^m$ and $2^n$ phases.

What is claimed is:

1. A demodulator for a multi-phase phase-modulated signal carrier wave for use in a time-division multiplex communication system, said carrier wave having $2^m$-phase phase-modulated bursts where m is a positive integer, each of said bursts having at its leading end portion a $2^n$-phase period where said carrier wave is $2^n$-phase phase-modulated and n is a positive integer smaller than m, comprising: first means responsive to the incoming carrier wave component for generating a reference carrier wave synchronized with said signal carrier wave; second means responsive to the incoming carrier wave component and to the output of said first means for detecting said $2^n$-phase phase-modulated portions to produce an output indicative of the duration of each of the last-mentioned portions; third means for subjecting said reference carrier wave to phase shifting for generating a first group of m-kinds of phase-shifted reference carrier waves and a second group of $n$-kinds of reference carrier waves respectively for the demodulation of the $2^m$-phase and $2^n$-phase phase-modulated portions of said signal carrier wave; switching means responsive to the output of said second means for selectively allowing only said n phase-shifted carrier waves to pass therethrough as an output during said $2^n$-phase period and for allowing only said $m$ phase-shifted carrier waves to pass therethrough as an output during the period other than said $2^n$-phase period; and m phase detector means supplied with said signal carrier wave and with the outputs of said switching means and providing a $2^m$-phase phase-demodulated output.

2. A demodulator as defined in claim 1 wherein said switching means comprises m switching circuits, and wherein said phase detector means comprises $m$ $2^n$-phase phase detectors supplied respectively with the outputs of said switching circuits.

3. A demodulator as defined in claim 2 where $m = 2$ and $n = 1$, and wherein said third means generates first, second and third phase-shifted reference carrier waves, the phase difference between said second wave and each of said first and second waves being 45 degrees but in opposite directions, one of said switching circuits being supplied with said first and second phase-shifted reference carrier waves, and the other of said switching circuits being supplied with said second and third phase-shifted reference carrier waves.

4. A method of demodulating a multi-phase phase modulated signal carrier wave having periodic $2^m$-phase phase modulated portions where m is a positive integer, each of said portions having at its leading end portion a $2^n$-phase period where said carrier wave is $2^n$-phase phase modulated and n is a positive integer smaller than m, said method comprising: generating a reference carrier wave synchronized with said signal carrier wave; detecting said $2^n$-phase phase modulated portions to produce an output indicative of the duration of each of the last-mentioned portions; phase shifting said reference carrier wave to generate a group of m and n kinds of phase-shifted reference carrier waves respectively for the demodulation of the $2^m$-phase and $2^n$-phase phase modulated portions of said signal carrier wave; and selectively combining, in response to said output, said signal carrier wave with a group of $n$ kinds of phase-shifted carrier waves only during said $2^n$-phase period and with a group of $m$ kinds of phase-shifted carrier waves only during the period other than said $2^n$-phase period.

* * * * *

UNITED STATES PATENT OFFICE
CERTIFICATE OF CORRECTION

Patent No. 3,815,034 Dated June 4, 1974

Inventor(s) Kotaro Kato

It is certified that error appears in the above-identified patent and that said Letters Patent are hereby corrected as shown below:

In The Specifications:

Column 1, line 14 - delete "manufactured" and insert -- manufacturing --

Column 2, line 15 - after "by" insert --a --

Column 3, line 47 - between "at" and "other" insert--the--

Signed and sealed this 1st day of October 1974.

(SEAL)
Attest:

McCOY M. GIBSON JR.
Attesting Officer

C. MARSHALL DANN
Commissioner of Patents